United States Patent
Chiu et al.

(10) Patent No.: US 9,741,496 B2
(45) Date of Patent: Aug. 22, 2017

(54) STACKED-TYPE SOLID ELECTROLYTIC CAPACITOR PACKAGE STRUCTURE AND METHOD OF MANUFACTURING THE SAME

(71) Applicant: APAQ TECHNOLOGY CO., LTD., Miaoli County (TW)

(72) Inventors: Chi-Hao Chiu, Hsinchu (TW); Kun-Huang Chang, Hsinchu (TW); Szu Chieh Huang, Miaoli County (TW)

(73) Assignee: APAQ TECHNOLOGY CO., LTD., Miao-Li County (TW)

( * ) Notice: Subject to any disclaimer, the term of this patent is extended or adjusted under 35 U.S.C. 154(b) by 76 days.

(21) Appl. No.: 14/862,823

(22) Filed: Sep. 23, 2015

(65) Prior Publication Data
US 2017/0025228 A1    Jan. 26, 2017

(30) Foreign Application Priority Data

Jul. 20, 2015    (TW) .............................. 104123399 A

(51) Int. Cl.
| | |
|---|---|
| *H01G 9/08* | (2006.01) |
| *H01G 9/00* | (2006.01) |
| *H01G 9/012* | (2006.01) |
| *H01G 9/26* | (2006.01) |
| *H01G 9/07* | (2006.01) |
| *H01G 9/15* | (2006.01) |

(52) U.S. Cl.
CPC ............. *H01G 9/08* (2013.01); *H01G 9/0029* (2013.01); *H01G 9/012* (2013.01); *H01G 9/15* (2013.01); *H01G 9/26* (2013.01); *H01G 9/07* (2013.01)

(58) Field of Classification Search
CPC ........ H01G 9/08; H01G 9/0029; H01G 9/012; H01G 9/15; H01G 9/26; H01G 9/07
USPC .......................................................... 361/535
See application file for complete search history.

(56) References Cited

U.S. PATENT DOCUMENTS

| | | | | |
|---|---|---|---|---|
| 2002/0015277 | A1* | 2/2002 | Nitoh ....................... | H01G 9/15 361/523 |
| 2015/0194270 | A1* | 7/2015 | Katsube ................... | H01G 9/15 174/257 |

* cited by examiner

*Primary Examiner* — Eric Thomas
*Assistant Examiner* — Michael P McFadden
(74) *Attorney, Agent, or Firm* — Li & Cai Intellectual Property (USA) Office

(57) ABSTRACT

A stacked-type solid electrolytic capacitor package structure includes a capacitor unit, a package unit, and a conductive unit. The capacitor unit includes a plurality of first stacked-type capacitors sequentially stacked on top of one another, and each first stacked-type capacitor has a first positive portion and a first negative portion. The package unit includes a package resin body for enclosing the capacitor unit. The conductive unit includes a first conductive terminal and a second conductive terminal. The first conductive terminal has a first embedded portion and a first exposed portion, and the second conductive terminal has a second embedded portion and a second exposed portion. An outermost one of first stacked-type capacitors has a plurality of first exposed soldering microgrooves formed on an outer surface thereof for contacting the package resin body. The instant disclosure further provides a method of manufacturing a stacked-type solid electrolytic capacitor package structure.

10 Claims, 10 Drawing Sheets

STACKED-TYPE SOLID ELECTROLYTIC CAPACITOR PACKAGE STRUCTURE AND METHOD OF MANUFACTURING THE SAME

BACKGROUND OF THE INVENTION

1. Field of the Invention

The instant disclosure relates to a solid electrolytic capacitor package structure and a method of manufacturing the same, and more particularly to a stacked-type solid electrolytic capacitor package structure and a method of manufacturing the same.

2. Description of Related Art

Various applications of capacitors include home appliances, computer motherboards and peripherals, power supplies, communication products and automobiles. The capacitors such as solid electrolytic capacitors are mainly used to provide filtering, bypassing, rectifying, coupling, blocking or transforming function. Because the solid electrolytic capacitor has the advantages of small size, large electrical capacitance and good frequency characteristic, it can be used as a decoupling element in the power circuit of a central processing unit (CPU). In general, a plurality of capacitor elements is stacked together to form a stacked solid electrolytic capacitor with a high electrical capacitance. In addition, the stacked solid electrolytic capacitor of the prior art includes a plurality of capacitor elements and a lead frame. Each capacitor element includes an anode part, a cathode part and an insulating part. The insulating part is insulated from the anode part and the cathode part. More specifically, the cathode parts of the capacitor elements are stacked on top of one another.

SUMMARY OF THE INVENTION

One of the embodiments of the instant disclosure provides a stacked-type solid electrolytic capacitor package structure, comprising: a capacitor unit, a package unit, and a conductive unit. The capacitor unit includes a plurality of first stacked-type capacitors sequentially stacked on top of one another and electrically connected with each other, and each first stacked-type capacitor has a first positive portion and a first negative portion. The package unit includes a package resin body for enclosing the capacitor unit. The conductive unit includes a first conductive terminal and a second conductive terminal separated from the first conductive terminal. The first conductive terminal has a first embedded portion electrically connected to the first positive portion of the first stacked-type capacitor and enclosed by the package resin body and a first exposed portion connected to the first embedded portion and exposed from the package resin body, and the second conductive terminal has a second embedded portion electrically connected to the first negative portion of the first stacked-type capacitor and enclosed by the package resin body and a second exposed portion connected to the second embedded portion and exposed from the package resin body. More particularly, an outermost one of first stacked-type capacitors has a plurality of first exposed soldering microgrooves formed on an outer surface thereof for contacting the package resin body, and the first exposed soldering microgroove is concaved on the outer surface of the outermost first stacked-type capacitor and extended along a first direction toward the first embedded portion of the first conductive terminal.

Another one of the embodiments of the instant disclosure provides a stacked-type solid electrolytic capacitor package structure, comprising: a capacitor unit, a package unit, and a conductive unit. The capacitor unit includes a plurality of first stacked-type capacitors sequentially stacked on top of one another and electrically connected with each other, and each first stacked-type capacitor has a first positive portion and a first negative portion. The package unit includes a package resin body for enclosing the capacitor unit. The conductive unit includes a first conductive terminal and a second conductive terminal separated from the first conductive terminal. The first conductive terminal has a first embedded portion electrically connected to the first positive portion of the first stacked-type capacitor and enclosed by the package resin body and a first exposed portion connected to the first embedded portion and exposed from the package resin body, and the second conductive terminal has a second embedded portion electrically connected to the first negative portion of the first stacked-type capacitor and enclosed by the package resin body and a second exposed portion connected to the second embedded portion and exposed from the package resin body. More particularly, an outermost one of first stacked-type capacitors has a plurality of first exposed soldering microgrooves formed on an outer surface thereof for contacting the package resin body, each of the other first stacked-type capacitors has a plurality of first embedded soldering microgrooves respectively corresponding to the first exposed soldering microgrooves, and the first exposed soldering microgroove and the first embedded soldering microgroove are concaved and extended along a first direction toward the first embedded portion of the first conductive terminal.

Yet another one of the embodiments of the instant disclosure provides a method of manufacturing a stacked-type solid electrolytic capacitor package structure, comprising: providing a first conductive terminal and a second conductive terminal separated from the first conductive terminal; placing a capacitor unit on the first conductive terminal and the second conductive terminal. The capacitor unit includes a plurality of first stacked-type capacitors sequentially stacked on top of one another and electrically connected with each other, and each first stacked-type capacitor has a first positive portion and a first negative portion; forming a package resin body for enclosing the capacitor unit. The first conductive terminal has a first embedded portion electrically connected to the first positive portion of the first stacked-type capacitor and enclosed by the package resin body and a first exposed portion connected to the first embedded portion and exposed from the package resin body, and the second conductive terminal has a second embedded portion electrically connected to the first negative portion of the first stacked-type capacitor and enclosed by the package resin body and a second exposed portion connected to the second embedded portion and exposed from the package resin body; and then bending the first exposed portion and the second exposed portion along an outer surface of the package resin body.

More particularly, an outermost one of first stacked-type capacitors has a plurality of first exposed soldering microgrooves formed on an outer surface thereof for contacting the package resin body, each of the other first stacked-type capacitors has a plurality of first embedded soldering microgrooves respectively corresponding to the first exposed soldering microgrooves, and the first exposed soldering microgroove and the first embedded soldering microgroove are concaved and extended along a first direction toward the first embedded portion of the first conductive terminal.

More particularly, the capacitor unit includes a plurality of second stacked-type capacitors sequentially stacked on top of one another and electrically connected with each other, and each second stacked-type capacitor has a second positive portion and a second negative portion. The first stacked-type capacitors are disposed on a top surface of the first embedded portion of the first conductive terminal, and the second stacked-type capacitors are disposed on a bottom surface of the first embedded portion of the first conductive terminal. An outermost one of second stacked-type capacitors has a plurality of second exposed soldering microgrooves formed on an outer surface thereof for contacting the package resin body, each of the other second stacked-type capacitors has a plurality of second embedded soldering microgrooves respectively corresponding to the second exposed soldering microgrooves, and the second exposed soldering microgroove and the second embedded soldering microgroove are concaved and extended along a second direction toward the first embedded portion of the first conductive terminal.

To further understand the techniques, means and effects of the instant disclosure applied for achieving the prescribed objectives, the following detailed descriptions and appended drawings are hereby referred to, such that, and through which, the purposes, features and aspects of the instant disclosure can be thoroughly and concretely appreciated. However, the appended drawings are provided solely for reference and illustration, without any intention to limit the instant disclosure.

DETAILED DESCRIPTION OF THE PREFERRED EMBODIMENTS

The embodiments of "a stacked-type solid electrolytic capacitor package structure and a method of manufacturing the same" of the instant disclosure are described. Other advantages and objectives of the instant disclosure can be easily understood by one skilled in the art from the disclosure. The instant disclosure can be applied in different embodiments. Various modifications and variations can be made to various details in the description for different applications without departing from the scope of the instant disclosure. The drawings of the instant disclosure are provided only for simple illustrations, but are not drawn to scale and do not reflect the actual relative dimensions. The following embodiments are provided to describe in detail the concept of the instant disclosure, and are not intended to limit the scope thereof in any way.

Figure 1:
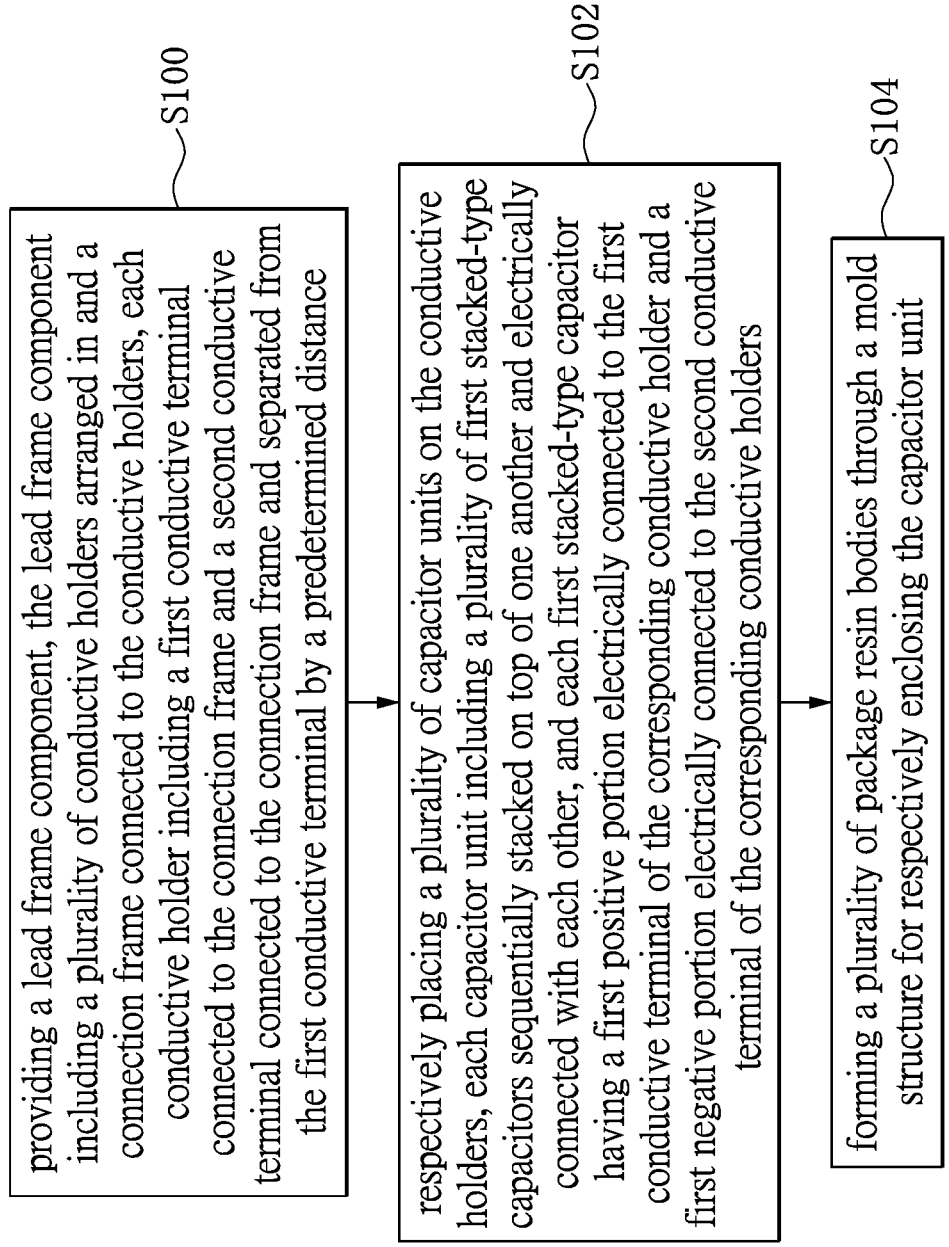
FIG. 1 shows a flowchart of a method of manufacturing a stacked-type solid electrolytic capacitor package structure according to one of the embodiments of the instant disclosure.
Figure 2:
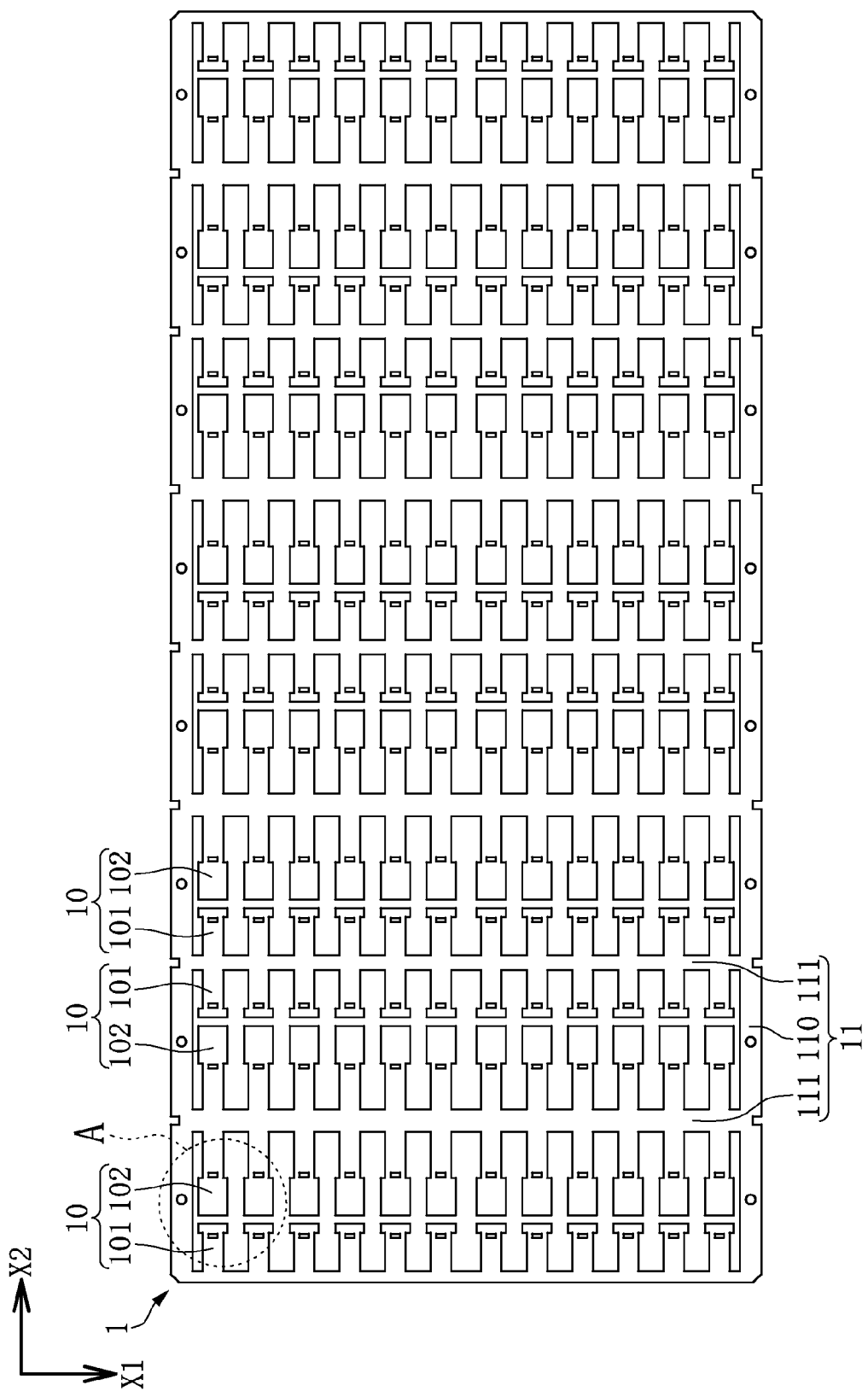
FIG. 2 shows a schematic view of a lead frame component of the stacked-type solid electrolytic capacitor package structure according to the instant disclosure.
Figure 3:
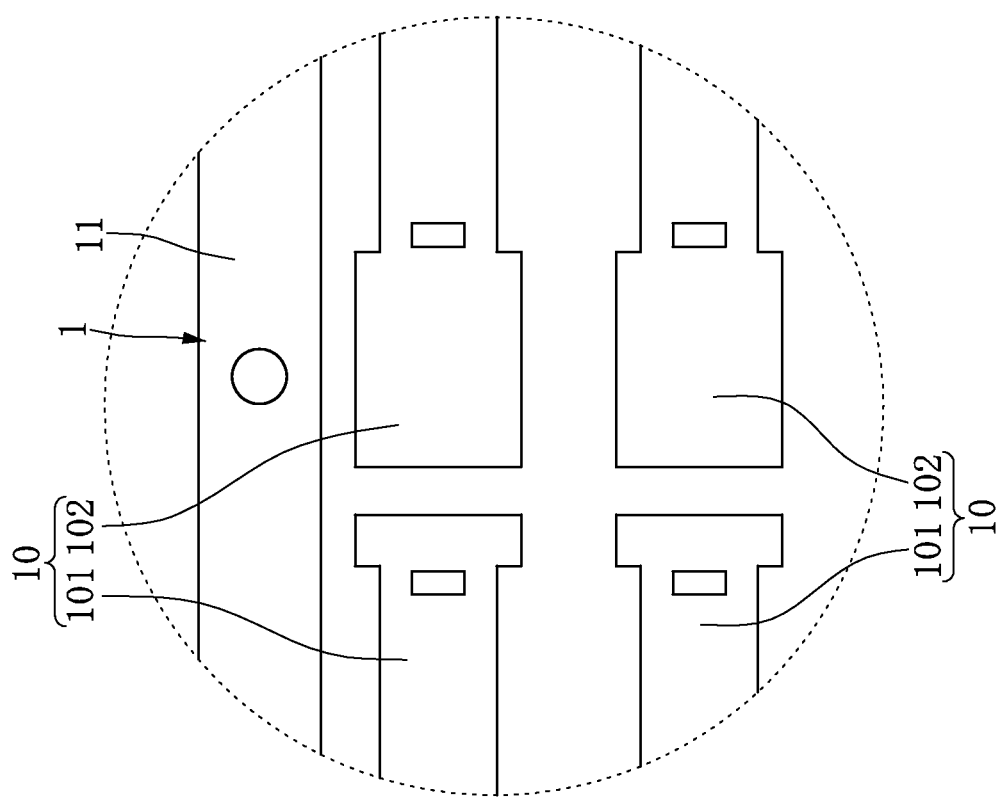
FIG. 3 shows an enlarged view taken on part A of FIG. 2.

Referring to FIG. 1 to FIG. 8, the instant disclosure provides a method of manufacturing a stacked-type (or chip-type) solid electrolytic capacitor package structure Z, comprising the following steps:

First, referring to FIG. 1, FIG. 2, and FIG. 3, the step S100 is: providing a lead frame component 1 (such as a lead frame), the lead frame component 1 including a plurality of conductive holders (supports) 10 arranged in and a connection frame 11 connected to the conductive holders 10, each conductive holder 10 including a first conductive terminal 101 connected to the connection frame 11 and a second conductive terminal 102 connected to the connection frame 11 and separated from the first conductive terminal 101 by a predetermined distance. More particularly, the connection frame 11 has a surrounding frame portion 110 and a plurality of connection portions 111 connected with the surrounding frame portion 110 and surrounded by the surrounding frame portion 110. In addition, a first predetermined horizontal direction X1 and a second predetermined horizontal direction X2 are vertical to each other, any two adjacent first conductive terminals 101 or any two adjacent second conductive terminals 102 horizontally extended along the first predetermined horizontal direction X1 are separated from each other, and any two adjacent first conductive terminals 101 or any two adjacent second conductive terminals 102 horizontally extended along the second predetermined horizontal direction X2 are connected with each other through the connection frame 11 and symmetrically disposed on opposite sides of the corresponding connection portion 111.

Figure 4:
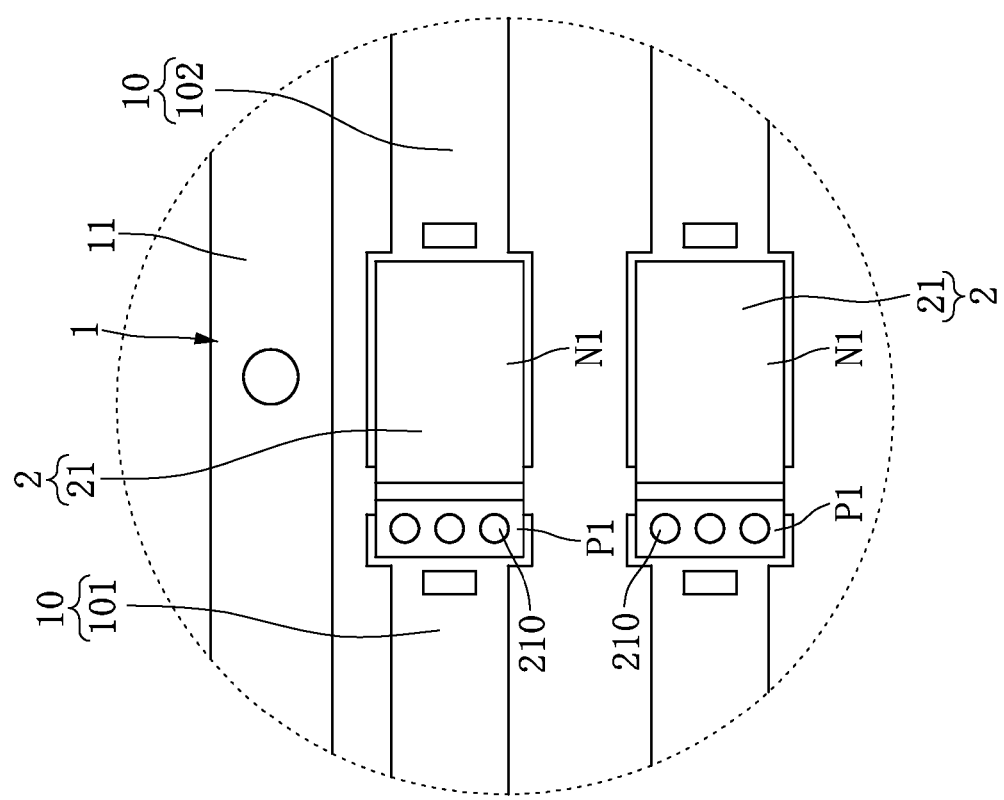
FIG. 4 shows an enlarged, schematic view of the manufacturing step S102 of the method of manufacturing a stacked-type solid electrolytic capacitor package structure according to the instant disclosure.

Next, referring to FIG. 1, FIG. 3, and FIG. 4, the step S102 is: respectively placing a plurality of capacitor units 2 on the conductive holders 10, each capacitor unit 2 including a plurality of first stacked-type capacitors 21 sequentially stacked on top of one another and electrically connected with each other, and each first stacked-type capacitor 21 having a first positive portion P1 electrically connected to the first conductive terminal 101 of the corresponding conductive holder 10 and a first negative portion N1 electrically connected to the second conductive terminal 102 of the corresponding conductive holders 10.

Figure 5:
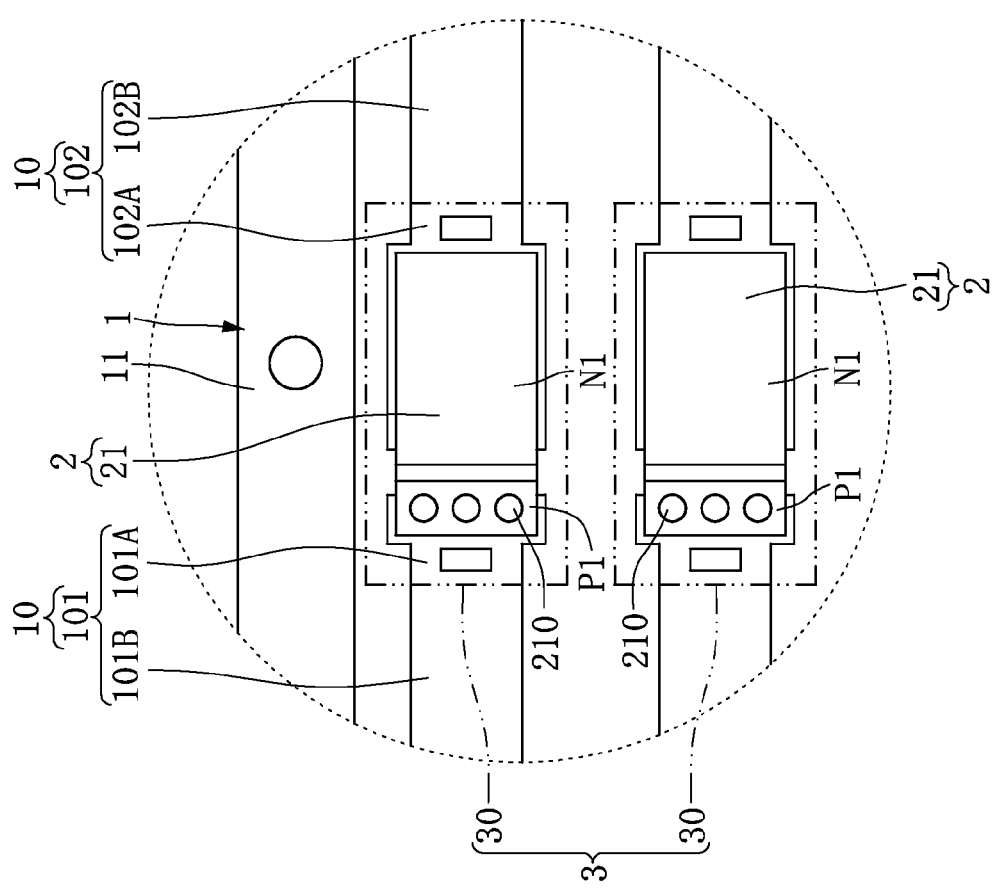
FIG. 5 shows an enlarged, schematic view of the manufacturing step S104 of the method of manufacturing a stacked-type solid electrolytic capacitor package structure according to the instant disclosure.
Figure 6:
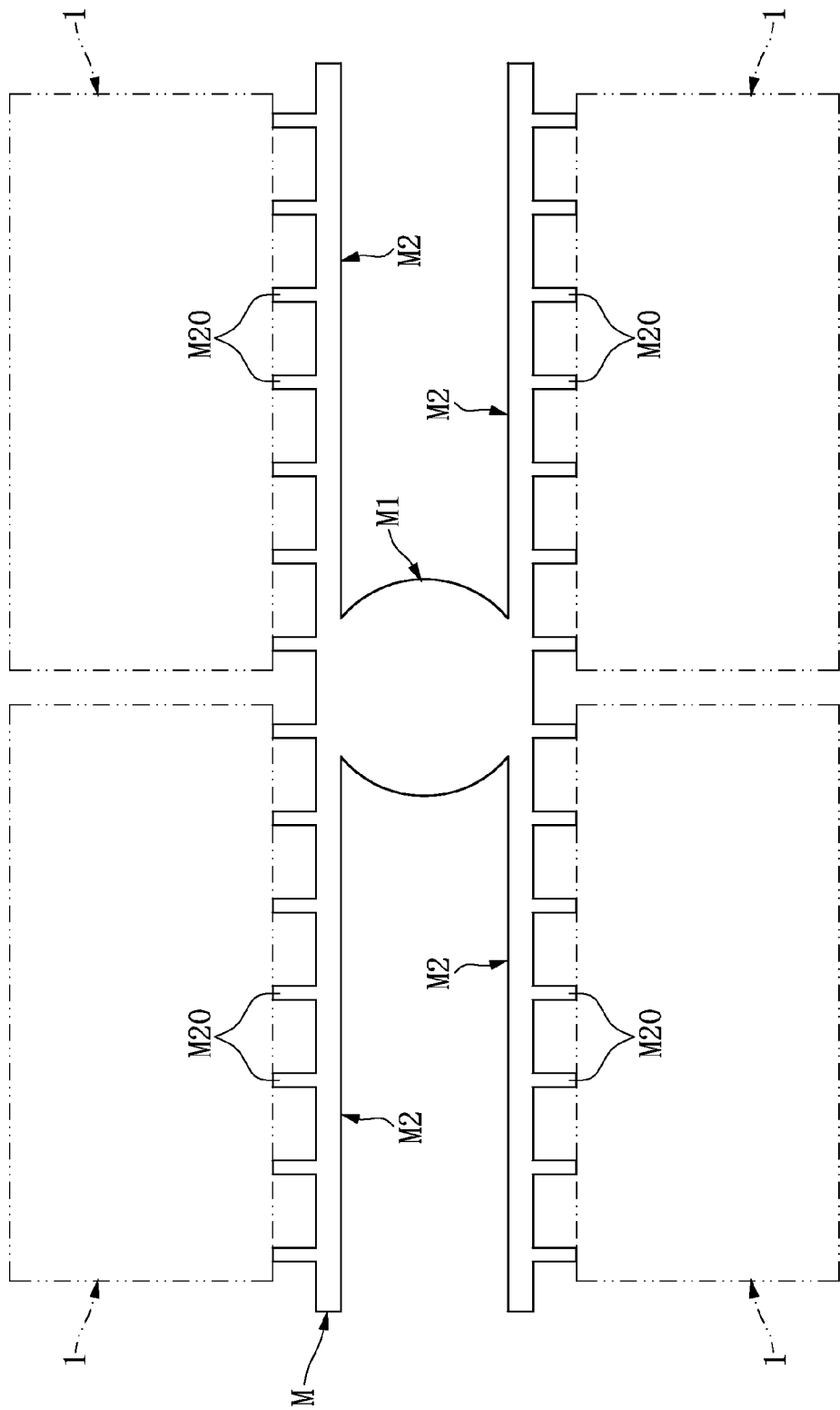
FIG. 6 shows a schematic view of a mold structure used by the stacked-type solid electrolytic capacitor package structure according to the instant disclosure.

Then, referring to FIG. 1, FIG. 5, and FIG. 6, the step S104 is: forming a plurality of package resin bodies 30 through a mold structure M for respectively enclosing the capacitor unit 2. For example, as shown in FIG. 6, the mold structure M includes a major flow channel M1 and at least four minor flow channels M2 communicated with the major flow channel M1, and each minor flow channel M2 has a plurality of resin injection passages M20 extended along the same direction. In addition, the resin injection passages M20 of each minor flow channel M2 correspond to the lead frame component 1, so that the package resin body 30 (such as opaque package material) can sequentially passes through the major flow channel M1, and the corresponding minor flow channels M2 and the resin injection passages M20 thereof to partially enclose the lead frame component 1. In other words, because the resin injection passages M20 of any one of the minor flow channels M2 can correspond to the lead frame component 1, the package resin body 30 can sequentially passes through the major flow channel M1, the corresponding minor flow channels M2, and the resin injection passages M20 to partially enclose the corresponding lead frame component 1.

Figure 8:
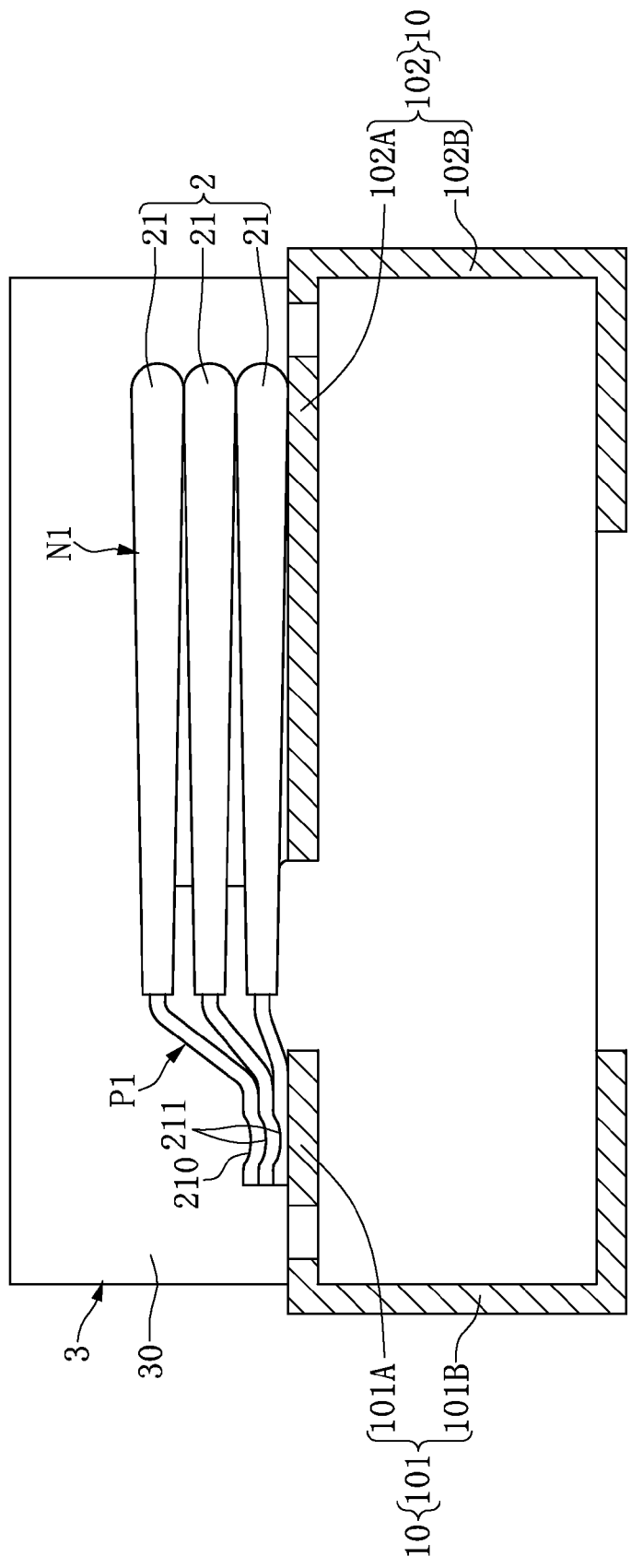
FIG. 8 shows a lateral, cross-sectional, schematic view of the stacked-type solid electrolytic capacitor package structure using a plurality of first stacked-type capacitors according to the instant disclosure.

Referring to FIG. 4, FIG. 5, and FIG. 8, it is worth mentioning that after the first stacked-type capacitors 21 are sequentially stacked on top of one another and fixed on the first conductive terminal 101 by soldering (such as electric resistance soldering, ultrasonic soldering, or laser soldering etc.), an outermost one of first stacked-type capacitors 21 (i.e., the outermost first stacked-type capacitor 21) has a plurality of first exposed soldering microgrooves 210 formed on an outer surface thereof, and the first exposed soldering microgrooves 210 are concaved on the outer surface of the outermost first stacked-type capacitor 21 and extended along a first direction toward the top surface of the first embedded portion 101A of the first conductive terminal 101. More particularly, the first stacked-type capacitors 21 can be pressed downwardly by a tool during the soldering process, so that the first exposed soldering microgrooves 210 are formed on the outer surface of the outermost first stacked-type capacitor 21. Hence, not only the bonding strength between two adjacent first stacked-type capacitors 21 is increased, but also the securing strength of the first stacked-type capacitors 21 fixed on the first embedded portion 101A of the first conductive terminal 101 is increased.

Figure 7:
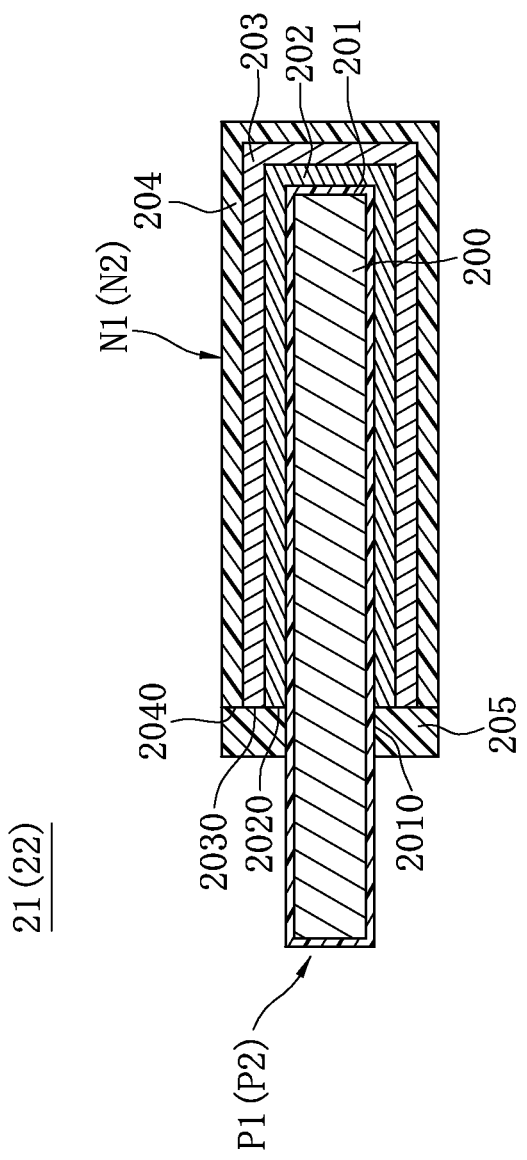
FIG. 7 shows a lateral, cross-sectional, schematic view of a single first stacked-type capacitor or a single second stacked-type capacitor of the stacked-type solid electrolytic capacitor package structure according to the instant disclosure.

Therefore, referring to FIG. 2, FIG. 5, and FIG. 7, the instant disclosure further provides a stacked-type solid electrolytic capacitor package structure Z, comprising: a lead frame component 1, a plurality of capacitor units 2, and a package unit 3. The lead frame component 1 includes a plurality of conductive holders 10 arranged in and a connection frame 11 connected to the conductive holders 10, and each conductive holder 10 includes a first conductive terminal 101 connected to the connection frame 11 and a second conductive terminal 102 connected to the connection frame 11 and separated from the first conductive terminal 101 by a predetermined distance. Moreover, the capacitor units 2 are respectively disposed on the conductive holders 10. Each capacitor unit 2 includes a plurality of first stacked-type capacitors 21 sequentially stacked on top of one another and electrically connected with each other, and each first stacked-type capacitor 21 has a first positive portion P1 electrically connected to the first conductive terminal 101 of the corresponding conductive holder 10 and a first negative portion N1 electrically connected to the second conductive terminal 102 of the corresponding conductive holder 10. In addition, the package unit 3 includes a plurality of package resin bodies 30 for respectively enclosing (encapsulating) the capacitor units 30.

More particularly, as shown in FIG. 5, the first conductive terminal 101 of each conductive holder 10 has a first embedded portion 101A electrically connected to the first positive portion P1 of the first stacked-type capacitor 21 (that is to say, the first embedded portion 101A is electrically connected to the first positive portion P1 of the bottommost first stacked-type capacitor 21) of the corresponding capacitor unit 2 and enclosed by the package resin body 30 and a first exposed portion 101B connected to the first embedded portion 101A and exposed from and outside the package resin body 30. In addition, the second conductive terminal 102 of each conductive holder 10 has a second embedded portion 102A electrically connected to the first negative portion N1 of the second stacked-type capacitor 21 (that is to say, the second embedded portion 102A is electrically connected to the first negative portion N1 of the bottommost first stacked-type capacitor 21) of the corresponding capacitor unit 2 and enclosed by the package resin body 30 and a second exposed portion 102B connected to the second embedded portion 102A and exposed from the package resin body 30.

More particularly, as shown in FIG. 7, each first stacked-type capacitor 21 includes a valve metal foil 200, an oxide insulation layer 201 for enclosing the valve metal foil 200, a conductive polymer layer 202 for covering one portion of the oxide insulation layer 201, a carbon paste layer 203 for enclosing the conductive polymer layer 202, and a silver paste layer 204 for enclosing the carbon paste layer 203. In addition, each first stacked-type capacitor 21 has a surrounding insulating layer 205 disposed on the outer surface of the oxide insulation layer 201 and around the outer surface of the oxide insulation layer 201, and the lengths of the conductive polymer layer 202, the carbon paste layer 203, and the silver paste layer 204 of each first stacked-type capacitor 21 are limited by the corresponding surrounding insulating layer 205. Furthermore, the oxide insulation layer 201 has a surrounding region 2010 formed on the outer surface thereof, and the surrounding insulating layer 205 of each first stacked-type capacitor 21 is surroundingly disposed on the surrounding region 2010 of the corresponding oxide insulation layer 201 and contacting an end 2020 of the corresponding conductive polymer layer 202, an end 2030 of the corresponding carbon paste layer 203, and an end 2040 of the corresponding silver paste layer 204. However, the first stacked-type capacitor 21 used in the instant disclosure is merely an example and is not meant to limit the instant disclosure.

Figure 9:
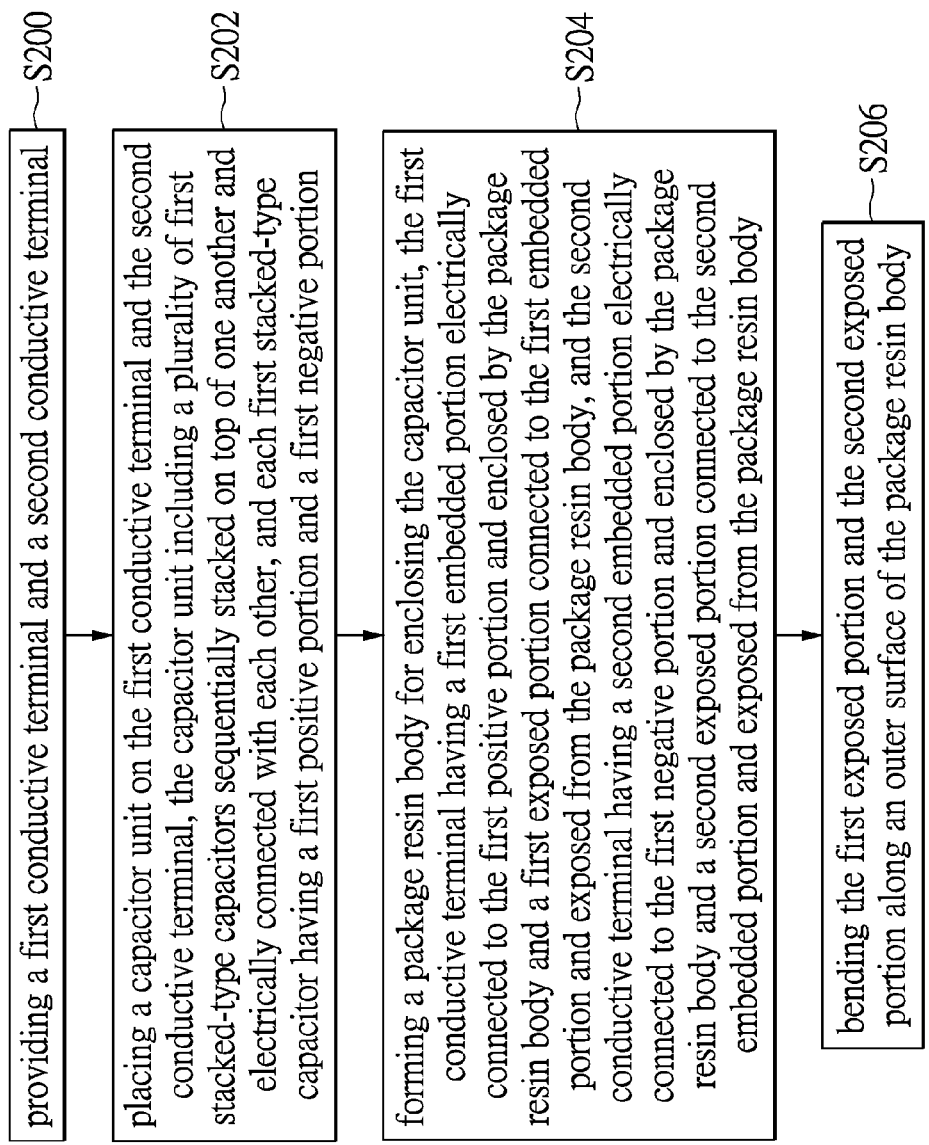
FIG. 9 shows a flowchart of a method of manufacturing a stacked-type solid electrolytic capacitor package structure according to another one of the embodiments of the instant disclosure.

Please note, referring to FIG. 8 and FIG. 9, the instant disclosure provides a method of manufacturing a single stacked-type solid electrolytic capacitor package structure, comprising: providing a first conductive terminal 101 and a second conductive terminal 102 separated from the first conductive terminal 101 (S200); placing a capacitor unit 2 on the first conductive terminal 101 and the second conductive terminal 102, the capacitor unit 2 including a plurality of first stacked-type capacitors 21 sequentially stacked on top of one another and electrically connected with each other, and each first stacked-type capacitor 21 having a first positive portion P1 and a first negative portion N1 (S202); forming a package resin body 30 for enclosing the capacitor unit 2, the first conductive terminal 101 having a first embedded portion 101A electrically connected to the first positive portion P1 of the first stacked-type capacitor 21 and enclosed (encapsulated) by the package resin body 30 and a first exposed portion 101B connected to the first embedded portion 101A and exposed from the package resin body 30, and the second conductive terminal 102 having a second embedded portion 102A electrically connected to the first negative portion N1 of the first stacked-type capacitor 21 and enclosed by the package resin body 30 and a second exposed portion 102B connected to the second embedded portion 102A and exposed from the package resin body 30 (S204); and bending the first exposed portion 101B and the second exposed portion 102B along an outer surface of the package resin body 30 (S206).

Please note, referring to FIG. 5, FIG. 8, and FIG. 9, after cutting the lead frame component 1, both the first exposed portion 101B and the second exposed portion 102B can be bent along an outer surface of the package resin body 30 to form the stacked-type solid electrolytic capacitor package structure Z. More particularly, the two first negative portions N1 of the two adjacent first stacked-type capacitors 21 are stacked on top of one another by silver paste (no label), and the two first positive portions P1 of the two adjacent first stacked-type capacitors 21 are stacked on top of one another by a soldering layer (no label).

Please note, referring to FIG. 5 and FIG. 8, after the first stacked-type capacitors 21 are sequentially stacked on top of one another and fixed on the first conductive terminal 101 by soldering (such as electric resistance soldering, ultrasonic soldering, or laser soldering etc.), an outermost one of first stacked-type capacitors 21 (i.e., the outermost first stacked-type capacitor 21) has a plurality of first exposed soldering microgrooves 210 formed on an outer surface thereof, each of the other first stacked-type capacitors 21 has a plurality of first embedded soldering microgrooves 211 respectively corresponding to the first exposed soldering microgrooves 210, and the first exposed soldering microgrooves 210 and the first embedded soldering microgrooves 211 are concaved and extended along a first direction toward the top surface of the first embedded portion 101A of the first conductive terminal 101.

Figure 10:
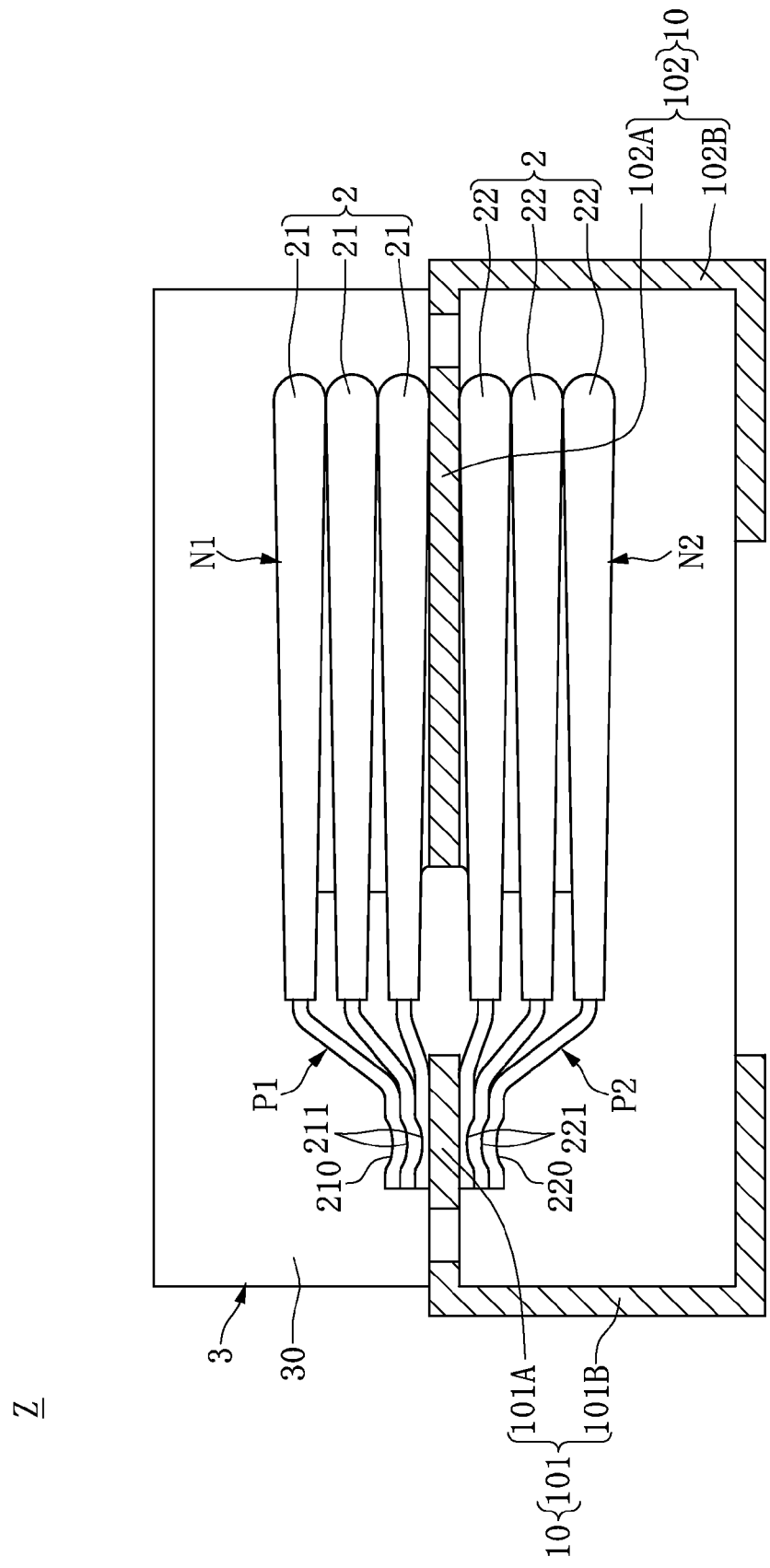
FIG. 10 shows a lateral, cross-sectional, schematic view of the stacked-type solid electrolytic capacitor package structure using a plurality of first stacked-type capacitors and a plurality of second stacked-type capacitors according to the instant disclosure.

Please note, referring to FIG. 10, the capacitor unit 2 further includes a plurality of second stacked-type capacitors 22 sequentially stacked on top of one another and electrically connected with each other, and each second stacked-type capacitor 22 has a second positive portion P2 electrically connected to the first conductive terminal 101 of the corresponding conductive holder 10 and a second negative portion N2 electrically connected to the second conductive terminal 102 of the corresponding conductive holder 10. In addition, the first stacked-type capacitors 21 of each capacitor unit 2 are disposed on a top surface of the corresponding conductive holder 10, and the second stacked-type capacitors 22 of each capacitor unit 2 are disposed on a bottom surface of the corresponding conductive holder 10. In other words, the first stacked-type capacitors 21 are disposed on the top surface of the first embedded portion 101A of the first conductive terminal 101, and the second stacked-type capacitors 22 are disposed on the bottom surface of the first embedded portion 101A of the first conductive terminal 101.

More particularly, as shown in FIG. 7, each second stacked-type capacitors 22 includes a valve metal foil 200, an oxide insulation layer 201 for enclosing the valve metal foil 200, a conductive polymer layer 202 for covering one portion of the oxide insulation layer 201, a carbon paste layer 203 for enclosing the conductive polymer layer 202, and a silver paste layer 204 for enclosing the carbon paste layer 203. In addition, each second stacked-type capacitors 22 has a surrounding insulating layer 205 disposed on the outer surface of the oxide insulation layer 201 and around the outer surface of the oxide insulation layer 201, and the lengths of the conductive polymer layer 202, the carbon paste layer 203, and the silver paste layer 204 of each second stacked-type capacitors 22 are limited by the corresponding surrounding insulating layer 205. Furthermore, the oxide insulation layer 201 has a surrounding region 2010 formed on the outer surface thereof, and the surrounding insulating layer 205 of each second stacked-type capacitors 22 is surroundingly disposed on the surrounding region 2010 of the corresponding oxide insulation layer 201 and contacting an end 2020 of the corresponding conductive polymer layer 202, an end 2030 of the corresponding carbon paste layer 203, and an end 2040 of the corresponding silver paste layer 204. However, the second stacked-type capacitor 22 used in the instant disclosure is merely an example and is not meant to limit the instant disclosure.

Please note, referring to FIG. 10, after the second stacked-type capacitors 22 are sequentially stacked on top of one another and fixed on the second conductive terminal 101 by soldering (such as electric resistance soldering, ultrasonic soldering, or laser soldering etc.), an outermost one of second stacked-type capacitors 22 (i.e., the outermost second stacked-type capacitor 22) has a plurality of second exposed soldering microgrooves 220 formed on an outer surface thereof, each of the other second stacked-type capacitors 22 has a plurality of second embedded soldering microgrooves 221 respectively corresponding to the second exposed soldering microgrooves 220, and the second exposed soldering microgrooves 220 and the second embedded soldering microgrooves 221 are concaved and extended along a second direction toward the bottom surface of the first embedded portion 101A of the first conductive terminal 101. More particularly, the second stacked-type capacitors 22 can be pressed downwardly by a tool during the soldering process, so that the second exposed soldering microgrooves 220 are formed on the outer surface of the outermost second stacked-type capacitor 22. Hence, not only the bonding strength between two adjacent second stacked-type capacitors 22 is increased, but also the securing strength of the second stacked-type capacitors 22 fixed on the first embedded portion 101A of the first conductive terminal 101 is increased.

The aforementioned descriptions merely represent the preferred embodiments of the instant disclosure, without any intention to limit the scope of the instant disclosure which is fully described only within the following claims. Various equivalent changes, alterations or modifications based on the claims of the instant disclosure are all, consequently, viewed as being embraced by the scope of the instant disclosure.

What is claimed is:

1. A stacked-type solid electrolytic capacitor package structure, comprising:
   a capacitor unit including a plurality of first stacked-type capacitors sequentially stacked on top of one another and electrically connected with each other, wherein each first stacked-type capacitor has a first positive portion and a first negative portion; and
   a package unit including a package resin body for enclosing the capacitor unit; and
   a conductive unit including a first conductive terminal and a second conductive terminal separated from the first conductive terminal, wherein the first conductive terminal has a first embedded portion electrically connected to the first positive portion of the first stacked-type capacitor and enclosed by the package resin body and a first exposed portion connected to the first embedded portion and exposed from the package resin body, and the second conductive terminal has a second embedded portion electrically connected to the first negative portion of the first stacked-type capacitor and enclosed by the package resin body and a second exposed portion connected to the second embedded portion and exposed from the package resin body;
   wherein an outermost one of first stacked-type capacitors has a plurality of first exposed soldering microgrooves formed on an outer surface thereof for contacting the package resin body, and the first exposed soldering microgroove is concaved on the outer surface of the outermost first stacked-type capacitor and extended along a first direction toward the first embedded portion of the first conductive terminal.

2. The stacked-type solid electrolytic capacitor package structure of claim 1, wherein each first stacked-type capacitor includes a valve metal foil, an oxide insulation layer enclosing the valve metal foil, a conductive polymer layer covering one portion of the oxide insulation layer, a carbon paste layer enclosing the conductive polymer layer, and a silver paste layer enclosing the carbon paste layer, wherein each first stacked-type capacitor has a surrounding insulating layer disposed on the outer surface of the oxide insulation layer and around the outer surface of the oxide insulation layer, and the lengths of the conductive polymer layer, the carbon paste layer, and the silver paste layer of each first stacked-type capacitor are limited by the corresponding surrounding insulating layer, wherein the oxide insulation layer has a surrounding region formed on the outer surface thereof, and the surrounding insulating layer of each first stacked-type capacitor is surroundingly disposed on the surrounding region of the corresponding oxide insulation layer and contacting an end of the corresponding conductive polymer layer, an end of the corresponding carbon paste layer, and an end of the corresponding silver paste layer.

3. The stacked-type solid electrolytic capacitor package structure of claim 1, wherein the capacitor unit includes a plurality of second stacked-type capacitors sequentially stacked on top of one another and electrically connected with each other, and each second stacked-type capacitor has a second positive portion and a second negative portion, wherein the first stacked-type capacitors are disposed on a top surface of the first embedded portion of the first conductive terminal, and the second stacked-type capacitors are disposed on a bottom surface of the first embedded portion of the first conductive terminal, wherein an outermost one of second stacked-type capacitors has a plurality of second exposed soldering microgrooves formed on an outer surface thereof for contacting the package resin body, and the second exposed soldering microgroove is concaved on the outer surface of the outermost second stacked-type capacitor and extended along a second direction toward the first embedded portion of the first conductive terminal.

4. The stacked-type solid electrolytic capacitor package structure of claim 3, wherein each second stacked-type capacitor includes a valve metal foil, an oxide insulation layer enclosing the valve metal foil, a conductive polymer layer covering one portion of the oxide insulation layer, a carbon paste layer enclosing the conductive polymer layer, and a silver paste layer enclosing the carbon paste layer, wherein each second stacked-type capacitor has a surrounding insulating layer disposed on the outer surface of the oxide insulation layer and around the outer surface of the oxide insulation layer, and the lengths of the conductive polymer layer, the carbon paste layer and the silver paste layer of each second stacked-type capacitor are limited by the corresponding surrounding insulating layer, wherein the oxide insulation layer has a surrounding region formed on the outer surface thereof, and the surrounding insulating layer of each second stacked-type capacitor is surroundingly disposed on the surrounding region of the corresponding oxide insulation layer and contacting an end of the corresponding conductive polymer layer, an end of the corresponding carbon paste layer, and an end of the corresponding silver paste layer.

5. A stacked-type solid electrolytic capacitor package structure, comprising:
a capacitor unit including a plurality of first stacked-type capacitors sequentially stacked on top of one another and electrically connected with each other, wherein each first stacked-type capacitor has a first positive portion and a first negative portion; and
a package unit including a package resin body for enclosing the capacitor unit; and
a conductive unit including a first conductive terminal and a second conductive terminal separated from the first conductive terminal, wherein the first conductive terminal has a first embedded portion electrically connected to the first positive portion of the first stacked-type capacitor and enclosed by the package resin body and a first exposed portion connected to the first embedded portion and exposed from the package resin body, and the second conductive terminal has a second embedded portion electrically connected to the first negative portion of the first stacked-type capacitor and enclosed by the package resin body and a second exposed portion connected to the second embedded portion and exposed from the package resin body;
wherein an outermost one of first stacked-type capacitors has a plurality of first exposed soldering microgrooves formed on an outer surface thereof for contacting the package resin body, each of the other first stacked-type capacitors has a plurality of first embedded soldering microgrooves respectively corresponding to the first exposed soldering microgrooves, and the first exposed soldering microgroove and the first embedded soldering microgroove are concaved and extended along a first direction toward the first embedded portion of the first conductive terminal.

6. The stacked-type solid electrolytic capacitor package structure of claim 5, wherein each first stacked-type capacitor includes a valve metal foil, an oxide insulation layer enclosing the valve metal foil, a conductive polymer layer covering one portion of the oxide insulation layer, a carbon paste layer enclosing the conductive polymer layer, and a silver paste layer enclosing the carbon paste layer, wherein each first stacked-type capacitor has a surrounding insulating layer disposed on the outer surface of the oxide insulation layer and around the outer surface of the oxide insulation layer, and the lengths of the conductive polymer layer, the carbon paste layer, and the silver paste layer of each first stacked-type capacitor are limited by the corresponding surrounding insulating layer, wherein the oxide insulation layer has a surrounding region formed on the outer surface thereof, and the surrounding insulating layer of each first stacked-type capacitor is surroundingly disposed on the surrounding region of the corresponding oxide insulation layer and contacting an end of the corresponding conductive polymer layer, an end of the corresponding carbon paste layer, and an end of the corresponding silver paste layer.

7. The stacked-type solid electrolytic capacitor package structure of claim 5, wherein the capacitor unit includes a plurality of second stacked-type capacitors sequentially stacked on top of one another and electrically connected with each other, and each second stacked-type capacitor has a second positive portion and a second negative portion, wherein the first stacked-type capacitors are disposed on a top surface of the first embedded portion of the first conductive terminal, and the second stacked-type capacitors are disposed on a bottom surface of the first embedded portion of the first conductive terminal, wherein an outermost one of second stacked-type capacitors has a plurality of second exposed soldering microgrooves formed on an outer surface thereof for contacting the package resin body, each of the other second stacked-type capacitors has a plurality of second embedded soldering microgrooves respectively corresponding to the second exposed soldering microgrooves, and the second exposed soldering microgroove and the second embedded soldering microgroove are concaved and extended along a second direction toward the first embedded portion of the first conductive terminal.

8. The stacked-type solid electrolytic capacitor package structure of claim 7, wherein each second stacked-type capacitor includes a valve metal foil, an oxide insulation layer enclosing the valve metal foil, a conductive polymer layer covering one portion of the oxide insulation layer, a carbon paste layer enclosing the conductive polymer layer, and a silver paste layer enclosing the carbon paste layer, wherein each second stacked-type capacitor has a surrounding insulating layer disposed on the outer surface of the oxide insulation layer and around the outer surface of the oxide insulation layer, and the lengths of the conductive polymer layer, the carbon paste layer and the silver paste layer of each second stacked-type capacitor are limited by the corresponding surrounding insulating layer, wherein the oxide insulation layer has a surrounding region formed on the outer surface thereof, and the surrounding insulating layer of each second stacked-type capacitor is surroundingly disposed on the surrounding region of the corresponding oxide insulation layer and contacting an end of the corresponding conductive polymer layer, an end of the corresponding carbon paste layer, and an end of the corresponding silver paste layer.

9. A method of manufacturing a stacked-type solid electrolytic capacitor package structure, comprising:

provided a first conductive terminal and a second conductive terminal separated from the first conductive terminal;

placing a capacitor unit on the first conductive terminal and the second conductive terminal, wherein the capacitor unit includes a plurality of first stacked-type capacitors sequentially stacked on top of one another and electrically connected with each other, and each first stacked-type capacitor has a first positive portion and a first negative portion;

forming a package resin body for enclosing the capacitor unit, wherein the first conductive terminal has a first embedded portion electrically connected to the first positive portion of the first stacked-type capacitor and enclosed by the package resin body and a first exposed portion connected to the first embedded portion and exposed from the package resin body, and the second conductive terminal has a second embedded portion electrically connected to the first negative portion of the first stacked-type capacitor and enclosed by the package resin body and a second exposed portion connected to the second embedded portion and exposed from the package resin body; and bending the first exposed portion and the second exposed portion along an outer surface of the package resin body;

wherein an outermost one of first stacked-type capacitors has a plurality of first exposed soldering microgrooves formed on an outer surface thereof for contacting the package resin body, each of the other first stacked-type capacitors has a plurality of first embedded soldering microgrooves respectively corresponding to the first exposed soldering microgrooves, and the first exposed soldering microgroove and the first embedded soldering microgroove are concaved and extended along a first direction toward the first embedded portion of the first conductive terminal.

10. The method of claim 9, wherein the capacitor unit includes a plurality of second stacked-type capacitors sequentially stacked on top of one another and electrically connected with each other, and each second stacked-type capacitor has a second positive portion and a second negative portion, wherein the first stacked-type capacitors are disposed on a top surface of the first embedded portion of the first conductive terminal, and the second stacked-type capacitors are disposed on a bottom surface of the first embedded portion of the first conductive terminal, wherein an outermost one of second stacked-type capacitors has a plurality of second exposed soldering microgrooves formed on an outer surface thereof for contacting the package resin body, each of the other second stacked-type capacitors has a plurality of second embedded soldering microgrooves respectively corresponding to the second exposed soldering microgrooves, and the second exposed soldering microgroove and the second embedded soldering microgroove are concaved and extended along a second direction toward the first embedded portion of the first conductive terminal.

* * * * *